US011059441B2

(12) United States Patent
Whitehead

(10) Patent No.: US 11,059,441 B2
(45) Date of Patent: *Jul. 13, 2021

(54) VEHICLE PROTECTION APPARATUS

(71) Applicant: SCRAPE ARMOR, INC., Bellevue, WA (US)

(72) Inventor: Scott Whitehead, Bellevue, WA (US)

(73) Assignee: SCRAPE ARMOR, INC., Bellevue, WA (US)

( * ) Notice: Subject to any disclaimer, the term of this patent is extended or adjusted under 35 U.S.C. 154(b) by 17 days.

This patent is subject to a terminal disclaimer.

(21) Appl. No.: 16/298,184

(22) Filed: Mar. 11, 2019

(65) Prior Publication Data

US 2019/0275969 A1 Sep. 12, 2019

Related U.S. Application Data

(63) Continuation of application No. 15/236,235, filed on Aug. 12, 2016, now Pat. No. 10,272,862.

(60) Provisional application No. 62/282,896, filed on Aug. 14, 2015.

(51) Int. Cl.
B60R 19/54 (2006.01)
(52) U.S. Cl.
CPC .................... B60R 19/54 (2013.01)
(58) Field of Classification Search
CPC .. B60R 13/04; B60R 19/54; B60R 2021/0053
See application file for complete search history.

(56) References Cited

U.S. PATENT DOCUMENTS

| 3,279,557 | A | 10/1966 | Halun |
| 4,655,307 | A | 4/1987 | Lamoureux |
| 5,501,290 | A | 3/1996 | Volz |
| 5,692,796 | A * | 12/1997 | Yamamoto ........... B62D 35/005 296/180.1 |
| 5,992,926 | A | 11/1999 | Christofaro et al. |
| 6,202,778 | B1 | 3/2001 | Mistry et al. |
| 6,435,298 | B1 | 8/2002 | Mizuno et al. |
| 6,516,907 | B2 | 2/2003 | Robinson |

(Continued)

FOREIGN PATENT DOCUMENTS

| DE | 1286917 U | 1/1969 | |
| DE | 102007021216 A1 * | 2/2008 | ........... B62D 21/155 |
| JP | 2856085 B2 | 3/2014 | |

OTHER PUBLICATIONS

Protekt Skid Plates, URL=http://web.archive.org/web/20141127140408/ protektskidplates.com/buy-now.html, Nov. 27, 2014, 2 pages.

(Continued)

Primary Examiner — Gregory A Blankenship
(74) Attorney, Agent, or Firm — Kevin S. Ormiston; Foster Garvey PC

(57) ABSTRACT

A protective panel for a vehicle substantially conforming to a portion of a vehicle. The protective panel having an upper surface and a lower surface opposite the upper surface, the lower surface having a reduced surface area in order to limit force applied to the protective panel and the vehicle. The panel further having an edge portion disposed along a perimeter, between the upper and lower surface, for deflecting obstacles, and one or more mounting points for removably attaching the protection panel to a portion of the exterior of a vehicle.

18 Claims, 10 Drawing Sheets

(56) References Cited

U.S. PATENT DOCUMENTS

| | | | |
|---|---|---|---|
| 7,624,835 B2 | 12/2009 | Bowers | |
| 8,366,170 B2 | 2/2013 | Glickman | |
| 8,403,403 B2 | 3/2013 | Tashiro et al. | |
| 8,579,361 B2 | 11/2013 | Takeuchi | |
| 8,668,245 B2 | 3/2014 | Kakiuchi et al. | |
| 8,746,782 B2* | 6/2014 | Naoi | B62D 35/02 296/193.07 |
| 9,586,537 B2 | 3/2017 | Abe | |
| 9,650,077 B2 | 5/2017 | Lim | |
| 9,783,235 B2 | 10/2017 | Patberg et al. | |
| 9,845,082 B2 | 12/2017 | Pallu | |
| 10,137,946 B2* | 11/2018 | Schoen | B62D 35/02 |
| 10,144,386 B2* | 12/2018 | Makowski | B60R 21/34 |
| 10,266,138 B2* | 4/2019 | Parker | B62D 35/02 |
| 10,272,862 B2* | 4/2019 | Whitehead | B60R 19/54 |
| 2001/0007395 A1 | 7/2001 | Gentile | |
| 2012/0043779 A1 | 2/2012 | Glickman | |
| 2012/0153643 A1 | 6/2012 | Mana et al. | |
| 2013/0026790 A1* | 1/2013 | Kakiuchi | B62D 35/02 296/193.07 |
| 2013/0057025 A1 | 3/2013 | Cabo et al. | |
| 2013/0181476 A1 | 7/2013 | Naoi | |
| 2014/0060952 A1 | 3/2014 | Mizukura | |
| 2015/0048607 A1* | 2/2015 | Patelczyk | B62D 25/12 280/770 |
| 2017/0043813 A1* | 2/2017 | Whitehead | B60R 19/54 |

OTHER PUBLICATIONS

Rodrigues, Jonathan, Ferrari 458 Italia Skid Plates Installation, URL=http://dubmagazine.com/home/latest-news/3-automotive/3186-85video-ferrari-458-italia-skid-plates-installation, Oct. 6, 2010.

Ferrari 458 Italia Skid Plates, URL=https://www.youtube.com/watch?v=KSYkirMOP5U&feature=youtu.be, image of Skid Plate, 1 page, Sep. 27, 2010.

International Search Report and Written Opinion for PCT/US2016/046896, dated Oct. 27, 2016, 7 pages.

European Examination Report for corresponding European Application No. 16837613.5, dated Sep. 15, 2020, 5 pages.

* cited by examiner

VEHICLE PROTECTION APPARATUS

PRIORITY CLAIM

This application is a continuation and claims priority to U.S. patent application Ser. No. 15/236,235 filed Aug. 12, 2016, which claims priority to U.S. Provisional Patent Application Ser. No. 62/282,896 filed Aug. 14, 2015. The above applications are hereby incorporated by reference as if fully set forth herein.

BACKGROUND OF THE INVENTION

Vehicles are being sold with more narrow approach and departure angles, or bottom surfaces with a low profile. Additionally, some consumers modify their vehicles, or use their vehicles in a non-standard way, making them more prone to contacting obstacles, for example, when cars are lowered or when vehicles are used for off-roading. When the exterior of a vehicle panel contacts a curb, street, pothole, speed-bump, rock, or other obstacle, it can cause significant damage to the vehicle at high cost. Traditional protection methods include add-on single or multi-piece plastic parts, where a large portion of the add-on piece comes into contact with the obstacle. This results in excessive force being applied to the vehicle, and in some situations, violent removal of the protective piece, the part of the vehicle to which it is attached, or both. Additionally, traditional methods are ill-fitting, do not extend sufficiently to the border of vehicle panels, and do not include a second edge that permits low friction movement over an obstacle. As a result, when a driver moves to back over the obstacle, such as a curb, the protective piece becomes a liability, snagging on the obstacle and exerting excessive force onto the vehicle and the protective piece and damaging the vehicle.

Further disadvantages include: the typical protective piece is made from thin or flimsy material; is not capable of being truly three dimensional; is ill-fitting; and does not utilize factory fasteners or requires excessive fasteners.

Accordingly, there is a need for a cost-effective protective panel that alleviates the problems associated with existing panels, has a low friction component, can withstand increased force, provides protection in more than one direction, and fits precisely.

BRIEF DESCRIPTION OF THE DRAWINGS

Preferred and alternative examples of the present invention are described in detail below with reference to the following drawings.

Figure 1A:
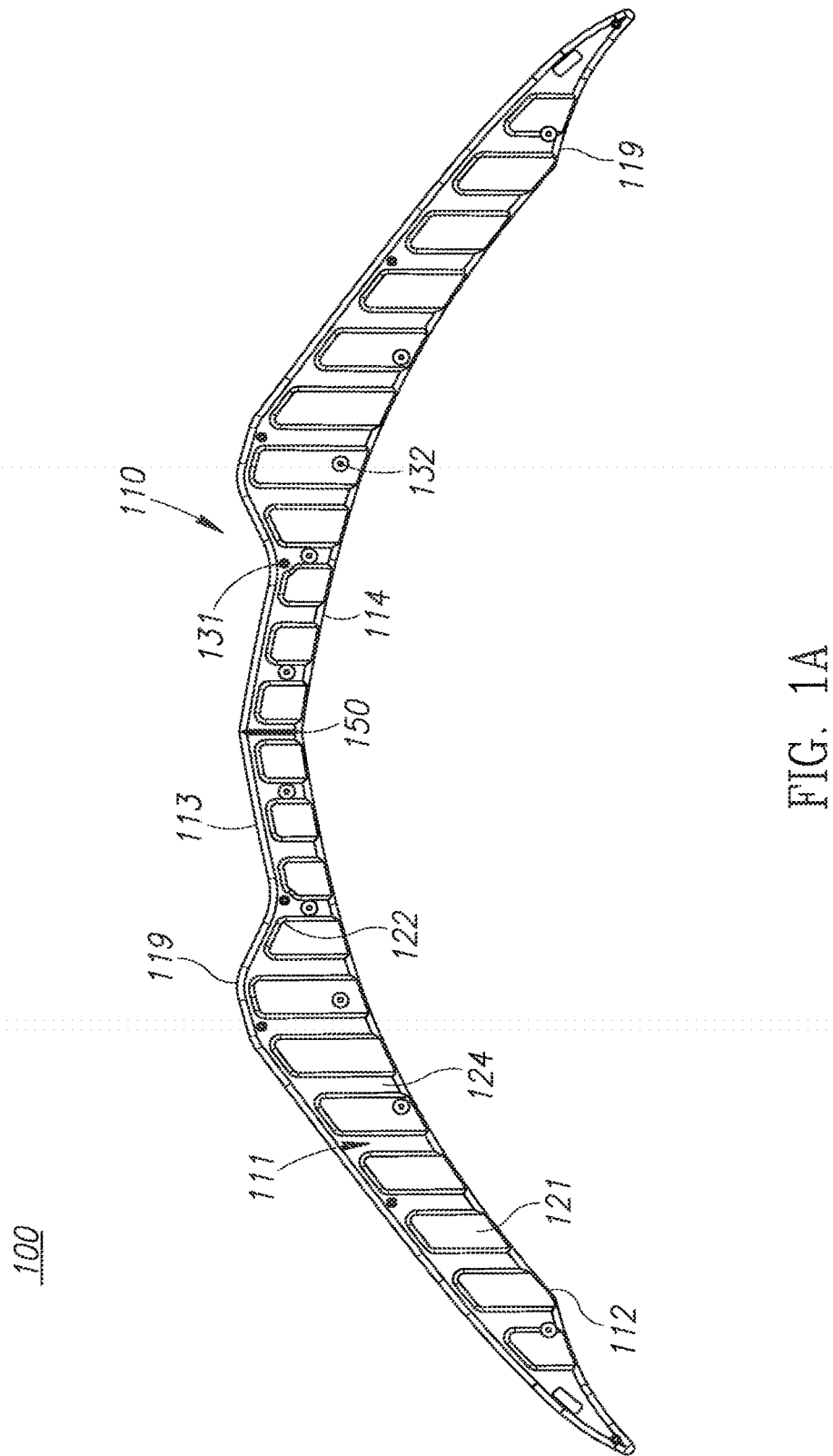
FIG. 1A is a top down view of the lower portion of a protective panel according to an embodiment of the invention.

Elements in the figures are illustrated for simplicity and clarity and have not necessarily been rendered according to any particular sequence or embodiment. For example, features may exist concurrently or in a different orientations and are illustrated in the figures to help improve the understanding of the embodiments of the present invention.

DETAILED DESCRIPTION OF THE PREFERRED EMBODIMENT

The preferred embodiment of the invention is not limited in its application to the details of construction and the arrangement of components set forth in the following description or illustrated in the following drawings. The preferred embodiment of the invention is capable of other embodiments and of being practiced or being carried out in various ways. Also, it is to be understood that the phraseology and terminology used herein is for the purpose of description and should not be regarded as limiting. The use of "including," "having," or "comprising" and variations thereof herein is meant to encompass the items listed thereafter and equivalents thereof as well as additional items. Unless specified or limited otherwise, the terms "connected," "supported," and "coupled" and variations thereof, are used broadly and encompass both direct and indirect mountings, connections, supports, and couplings. It is also to be understood that "connected" and "coupled" are not restricted to physical or mechanical connections or couplings. Further, the use of absolute terms such as "must," "will," and the like, as well as specific quantities, plurals or singulars, are to be construed as being applicable to one or more of such embodiments, but not necessarily to all such embodiments. As such, embodiments of the invention may omit, or include a modification of, one or more features or functionalities described in the context of such absolute terms.

The present invention relates generally to devices, systems, and methods for increasing protection of surfaces of vehicles from being damaged. For example, embodiments of the present invention may, but are not limited to, be utilized to protect surfaces of vehicles from being damaged by debris, curbs, the road surface, or other articles that may cause damage to an exterior surface of a vehicle. Vehicle is understood to mean at least, but not limited to, cars, trucks, SUVs, boats, airplanes, ATVs, side-by-sides, tractors, motorcycles, scooters, bicycles, skateboards, Segway's, wheelchairs, and the like.

In one embodiment of the invention, a user may desire to increase the protection on one or more portions of their vehicle. By installing a protective panel according to an embodiment of the present invention, a user may protect various parts of their vehicle from scratches, dings, abrasive marks, fractures, and the like.

In order to ensure proper fitment, a catalog of designs may be created for specific vehicles and specific trim-levels of an individual vehicle or for individual design needs. The design may include, but is not limited to, for example, the overall shape, position of mounting holes, and overall contour of the vehicle panel. The protective panel then may be produced by injection molding, multi-axis milling, single or multi-process machining, 3D printing, fabricating or other methods according to the design parameters and needs of the specific embodiment. For embodiments of the invention that include shape on the Z-axis, in order to better fit vehicle contours, various methods, such as multi-axis milling, 3D printing, injection molding, or fabrication may be preferable. The protective panels are preferably easy to install, on account of their precise fit. An installer may also optionally apply various additional components in order to increase the appearance and integration of the part. Features of the various embodiments may be, for example, designed into a mold or carved out of a blank in order to achieve the benefits described herein.

The protective panel may be installed on a specific vehicle such that it provides a layer of protection to a specific portion of the exterior of the vehicle. In one example of the preferred embodiment, it may be installed on the underside of the front bumper of a sports-car. When the driver pulls out of a driveway, should the approach angle be too shallow, the protective panel provides a barrier between the vehicle panel and the road surface. In a further example, a protective panel may be installed under a rocker panel, such that when a lowered car traverses a speed-bump, the protective panel makes contact with the obstacle.

In a preferred embodiment, the protective panel has a reduced and limited surface area that comes into contact with the road surface, or any other obstacle, thereby reducing the stress or force imparted on the exterior of the vehicle or panel mounting points. In order to reduce the surface area of the panel while maintaining appropriate protective traits, the panel may include a number of pockets and rails. The pockets reduce the area of the lower surface that is likely to come into contact with an obstacle. The rails provide adequate support to the panel component while also providing a barrier between the obstacle and the vehicle. The combination of pockets and rails may occur in many orientations, including those not specifically mentioned herein. In addition, the protective panel may include one or more edges of varying design to smoothly transition an obstacle onto the lower surface of the panel. Additionally, the protective panel may be shaped in such a way as to extend to the outer most portion of the portion of the vehicle it is covering, the border, thereby reducing the chances of an obstacle coming into contact with an unprotected portion of the vehicle panel where protection is desired.

In a preferred embodiment, where a protective panel has two sides, both sides include and edge, and both edges extend to the furthest perimeter portion of the exterior panel to be protected. In this way, no matter which direction force is applied to the protective panel, the obstacle will not snag on the panel potentially causing excessive damage. Further, the back, rearward, side, front, first, or second edge may be of a preferred profile, for example a 1" radius or other portions of an ellipse, circle, angle or other shape or otherwise designed in such a way as to limit the force applied to the vehicle and panel mounting points when an obstacle makes contact with an edge.

In an additional embodiments, the protective panel may be installed on, for example, but not limited to, portions of a vehicle including the rocker panel, side skirt, the rear of the vehicle, valance, diffuser, door, bumper, splitter, dive plane, or at some other point where protection is desired on the exterior the vehicle.

Preferred and alternative embodiments of the present invention are discussed below and illustrated in the accompanying drawing figures. Turning to the drawing figures, identical numerals correspond to the same or similar features in each of the several embodiments. The drawings are not intended to indicate the scale or relative proportions of the elements shown therein. Unless otherwise noted, all parts are preferably fabricated from any suitable material, including for example, but in no way limited to: plastic; polyethylene; HDPE, textile materials; natural materials; wood; metal; or any other material or combination of materials capable of providing adequate stability, resilience, and appearance.

Figure 1B:
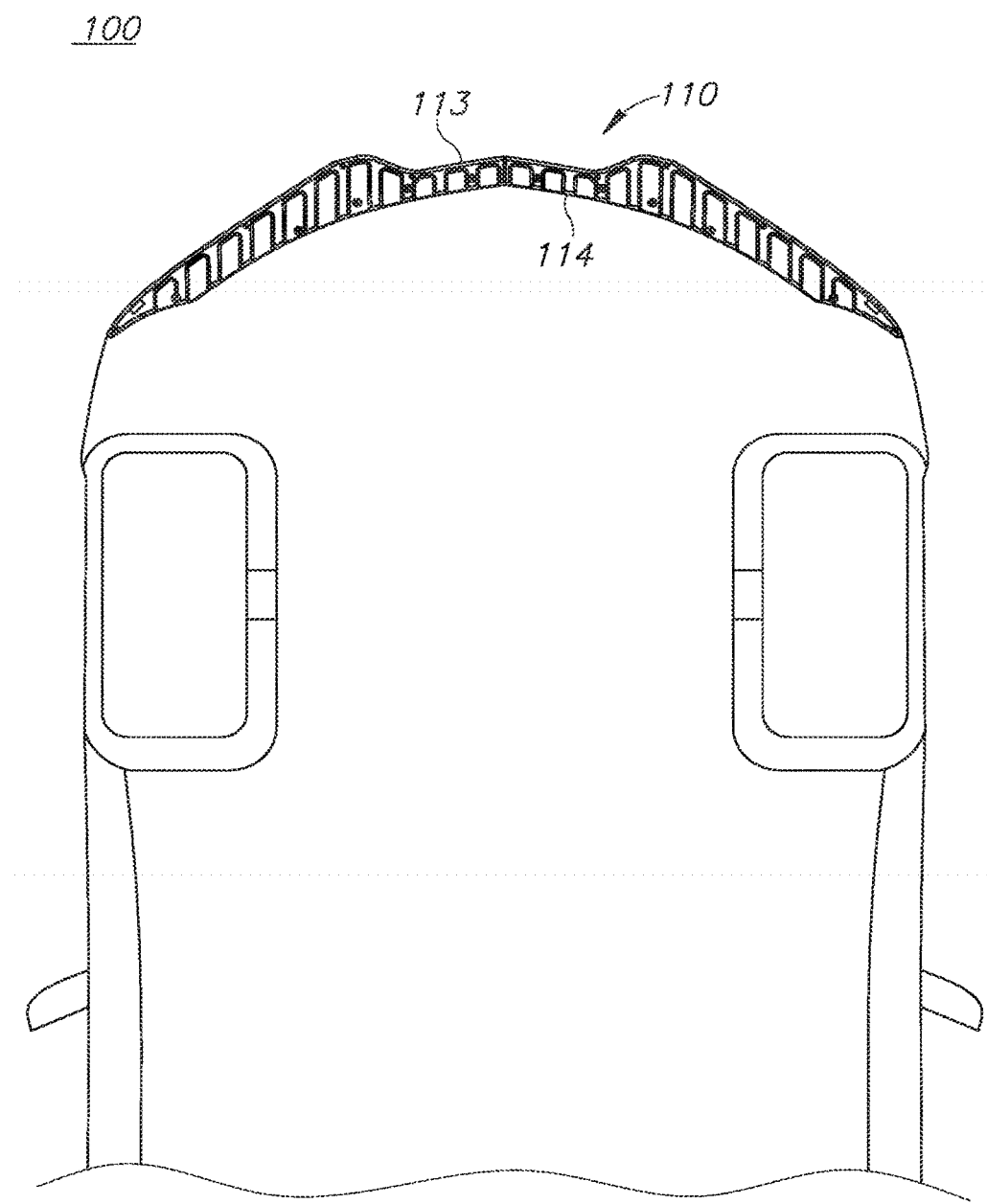
FIG. 1B is an installed view of a protective panel according to the embodiment illustrated in FIG. 1.

In accordance with one embodiment 100, a protective panel 110 is illustrated in FIGS. 1A-3. FIG. 1 illustrates a top down view of the lower surface 111 representative of an embodiment 100 of a protective panel 110. When installed, this view may be available by viewing from underneath the car. Protective panel 110 may be made of any number of materials. Preferably, the protective panel 110 is made of a suitably strong material that also has a low coefficient of friction. The protective panel 110 may also comprise an upper surface 112, which is preferably located opposite the lower surface 111 and may make contact with a portion of vehicle. This upper surface 112 may be machined, curved, flat, or otherwise shaped to accommodate the particular application area on a vehicle. The upper surface 112 may also facilitate locking one or more protective panels together, for example, at a point 150, by incorporating, for example, a male and female edge. Protective panel 110 may have a first edge 113. In this particular embodiment 100, the first edge 113 is located at the front of the front bumper of a vehicle, as shown in FIG. 1B. In other embodiments this first edge 113 may be located toward the side or rear of the vehicle depending on the exterior part to be protected. The protective panel 110 may also have a second edge 114. In this particular embodiment, the second edge 114 is at the rear of the front-pumper of a vehicle, as shown in FIG. 1B. In other embodiments this second edge 114 may be located toward the side or front of the vehicle depending on the exterior panel to be protected. The first edge 113 and the second edge 114 may be formed such that they meet or match, generally, the profile of the vehicle manufactures existing design. The addition of the first and second edges may also be called, generally, the edge and may form a perimeter portion. The first and second edge may also be formed in the same manner, for example the same profile, radius, angle or design. The first and second edge, in combination refer to the two or more edges that form the overall perimeter or circumference of the protective panel. In a preferred embodiment, the first and second edges meet at at-least two points of the protective panel 110 in order to form the circumference or perimeter. In other embodiments additional edges may be necessary.

The shape 119 corresponds to the curvature of, in this example, the bottom of the vehicle's front bumper. In additional embodiments the shape 119 may correspond to any other part or exterior portion where protection is desired, and will differ depending on the required application, or may differ from the vehicle's design where necessary. In other examples the shape 119 may correspond to other parts of a vehicle, such as, for example but not limited to, a side-skirt, rocker panel, rock slider, rear bumper, valence, door, bumper, splitter, diffuser, or any other area where protection is desired. The shape 119 will generally be as organic and smooth as possible in order to avoid hard edges or unnecessary uneven portions. Changes in direction, for example, will often use a curved profile, as opposed to a squared off transition portion. Similarly, where gentle curves in the x-y plane exist, long smooth curved sections may be used so long as they follow the shape of the vehicle panel to which the protective panel is attached.

In many examples it is important that first edge 113 be located as close to the boundary of the part to be protected as possible. Preferably, where the protective panel 110 is located, for example, on a front pumper, the first edge 113 matches as closely as practicable the shape of the bumper. In an additional example, where the panel is located on a rocker panel, the first edge 113 preferably matches as closely as possible the side edge of the rocker panel. A correct fit may increase the protective qualities of the panel, such that an obstacle will strike the protective panel instead of any portion of the exterior of the vehicle. In a preferred embodiment the first edge 113 matches and covers the furthest from center portions of the portion of the vehicle to be protected. When disposed in this manner, the first edge 113 comes into contact with an obstacle before the part to be protected. In many examples the second edge 114 is located as close as possible to a different perimeter portion of the part to be protected. The second edge 114 may match, for example, as closely as practicable the shape of the rear section of the front bumper, or the opposite side of a rocker panel. By extending the second edge 114 to the edge of the part to be protected, it protects the vehicle panel from forces in the opposite direction. For example, when backing over a curb, edge 114 prevents unnecessary strain on the bumper by extending the panel 110, or further when sliding over a rock the edge 114 protects the rocker panel in the opposite direction from edge 113. By utilizing an edge 114 the invention allows for smoothly guiding an obstacle across the protective panel 110 without the obstacle becoming stuck, or causing increased force when contacting the protective panel 110. In other embodiments there the first and second edge may simply form an edge that traverses the perimeter of the protective plate matching as closely as practical the boundary of the vehicle panel to be protected. The boundary corresponds to the edges of the protection area only, and not the entire panel itself. For example, where a bumper is the panel to be protected, the boundary may correspond to one or more smaller portions, for example on the underside of the bumper, where contact with obstacles is most likely.

In a preferred embodiment, and as illustrated in FIGS. 1A-3, there are a number of pockets 121 along the lower surface of varying shape. The pockets 121 act to lessen the surface area along the panel of the lower surface by pulling the pocket area toward the upper surface and away from the plane of the lower surface, creating a recessed area, thereby removing material from the area most likely to make contact with an obstacle. The actual surface area of the lower surface is preferably less than the area inside the perimeter of the lower surface. In some embodiments the surface area may be reduced by 5-90% depending on the needs of the plate. Other embodiments may differ and have greater or less surface area reduction. Obstacles making contact with the protective panel transfers less force, via friction, as a result of the lower surface area, onto the vehicle itself, the protection panel, and any mounting means. Along the second edge 114 there may be places where the pocket 121 intersects the edge 114 to create an edge of a reduced thickness 115. The difference between the rearward edge 114 at these points of intersection resulting in edge 115 is clearly depicted in FIG. 2C. In some embodiments the pockets may not extend through the second or rearward edge 114. The pockets 121 reduce the overall surface area of the lower surface 112. In some embodiments there may be many smaller pockets, or fewer larger pockets, depending on the needs of the part. Pockets may also take any shape. For example, in some embodiments the pockets may be circular, triangular, square, or other more varied nonconforming shapes. In an additional embodiment, there may be one large pocket 121 surrounded by a perimeter 117 and edges 113 and 114 such that the entire middle of the protective panel comprises a recessed area. Pockets of a protective plate 110 may also extend through the thickness of the plate such that there is no plate material at one or more pocket locations.

Figure 2A:
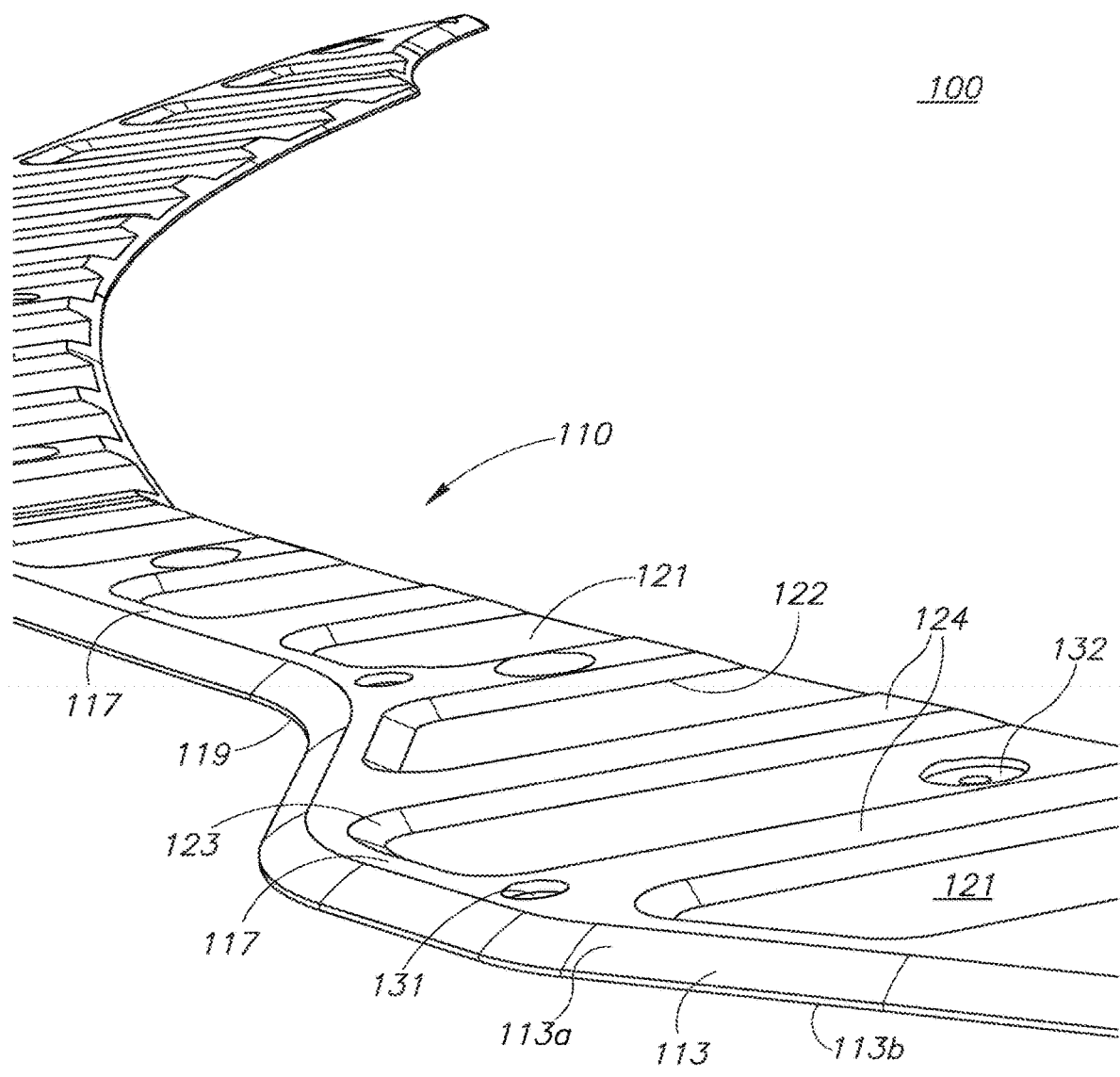
FIGS. 2A-C illustrate various aspects of the protective panel depicted in FIG. 1.
Figure 2B:
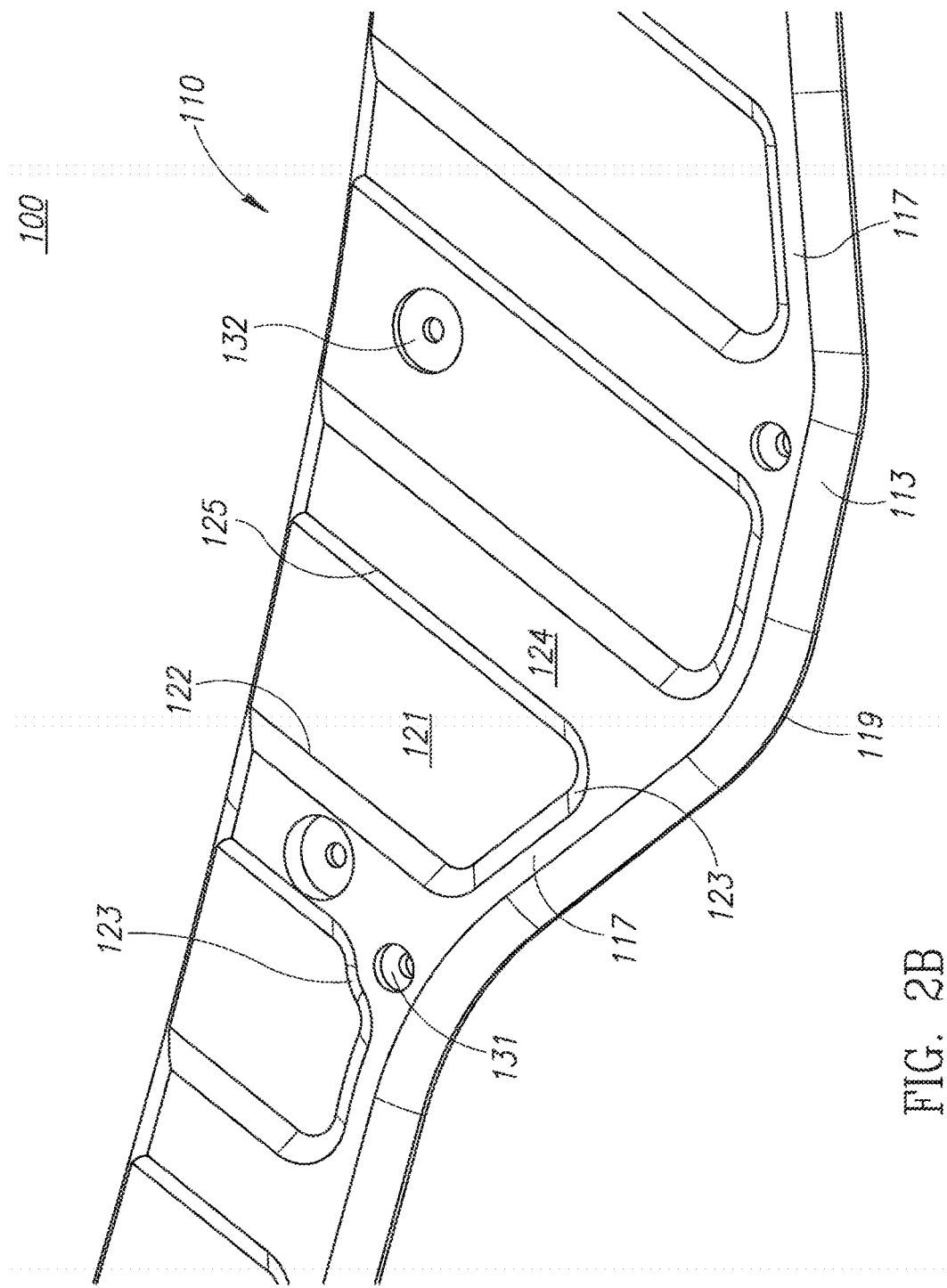
Figure 2C:
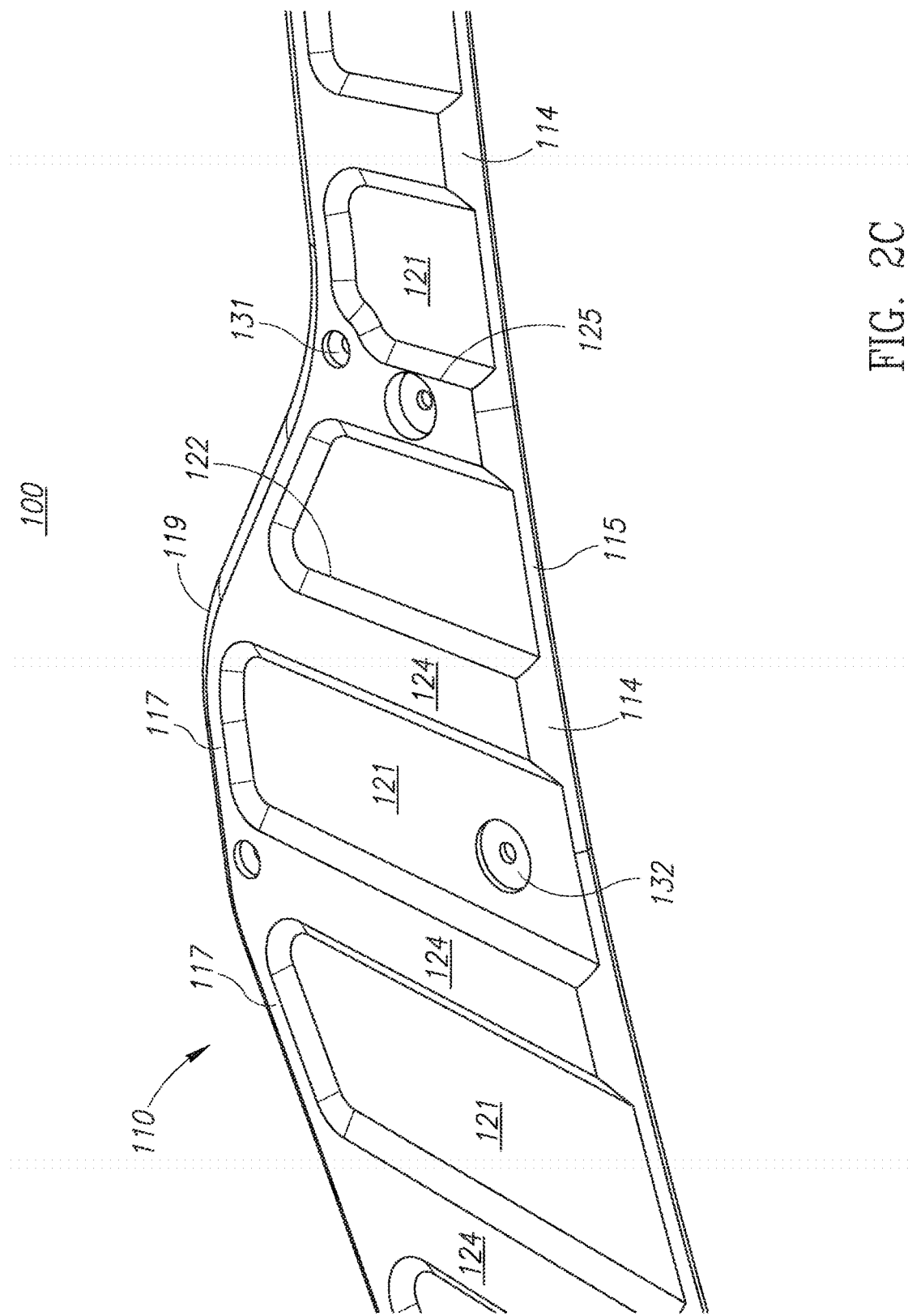

FIGS. 2A, 2B, and 2C illustrate different views of one portion of the protective panel 110 in accordance with FIG. 1 and embodiment 100. FIG. 2A illustrates a side profile and close up view of one possible embodiment of the protective panel 110. As illustrated, the first edge 113 is optionally composed of an edge profile 113a-n. The profile of the first edge 113 can be many different profiles. For example it may be a radius portion, an ellipse, angle or otherwise. In some embodiments the profile of the first edge 113 extends from the upper surface 112 to the lower surface 111 such that the upper portion of the first edge 113 is further away from the center of the panel than the lower portion of the first edge 113. In the depicted exemplary embodiment, the first edge 113 is composed of a first profile 113a and a second profile 113b which corresponds to an area perpendicular to the upper surface 112. In a preferred embodiment the first edge 113 may be in two sections, the first a profile 113a of a 1" radius, for example extending immediately from the lower side 111 and extending toward the upper surface along an arc meeting the second part 113b near the upper surface. The first edge may be composed of any number of portion 113a-n. The first edge 113 allows obstacles encountered by the protective panel 110 to slide with reduced force along, across, or over the edge 113. In embodiments including the second section 113b, the perpendicular portion can be used as a blending point, allowing for a sealing agent to be applied along the edge portion 113b preventing debris from becoming lodged in between the vehicle and the upper surface 112. The sealing agent may also provide a premium fit and finish to the product. The edge 113 may also be composed of, but not limited to, a single profile, radius, curve, ellipse, or angle.

As depicted in FIG. 2B, the point between where the lower portion of the first edge 113 meets the lower surface 111 and any pocket 121, is the lower strip 117. The lower strip 117 provides strength along the shape 119 of the first edge 113. In some embodiments the width of the lower strip 117 can be adjusted depending on the needs of the protective panel. For example, where increased forces are expected, the lower strip 117 may be larger. In additional embodiments there may be no lower strip 117. In these embodiments the edge of pocket 121 meets the lower portion of the first edge 113 at points not including a rail 124. In additional embodiments, a fastener mounting location 130 may be placed at least partially or completely along the lower strip 117.

A number of pockets 121 are located at the lower surface 111. The floor of the pocket 121 is moved toward the upper surface 112, thereby removing surface area from the lower surface 111 creating a recessed area. By lowering the surface area of the lower surface 111 the protective panel 110 glides more smoothly, with less friction, and less overall force, over obstacles and therefore is less likely to damage the portion of the vehicle to which it is attached. As depicted, in some embodiments the shape of the pocket 121 follows generally the shape 119 of the protective panel 110. In other embodiments the pocket 121 may be of random shapes. The pocket edges 122 closest to the first edge 111 may follow closely the shape of the first edge 113, or may differ from the shape of the first edge. In at least one embodiment, the pocket is at least the thickness of the first lower strip 117 away from the first edge 113. In a preferred embodiment, the floor of a pocket is never closer than 0.1, 0.2, 0.3, 0.4, or 0.5 inches from the start of the first edge 113. In other embodiments the pocket 121 may extend all the way to or through the first edge 113. The pocket may be of varying depth with respect to the plane created by the lower surface and any rails 124 therein. For example, in a preferred embodiment the pocket may be 25-75% the thickness of the panel. In other embodiments the pocket may extend through the protective panel completely such that no portion of the protective panel covers those portions. In other embodiments the pocket may be shallower. The protective panel may be any thickness. In a preferred embodiment the protective panel is between 0.1 and 3 inches thick. In addition to pockets 121, the lower surface is comprised of a number of rails 124. In a preferred embodiment the rails 124 extend from the first edge 113 to the second edge 114. In other embodiments the rail may be shorter or longer. In a preferred embodiment, and as illustrated, the rail 124 may be bordered on either side by a pocket 121. The width of a rail 124 may generally be constant along its length. In other examples, the width of a rail 124 may increase or decrease as it nears a corner pocket edge 122 closer to the first edge 113 or second edge 114. Further, the rail 124 may take on any different shape. In many embodiments the rail edges 125 are preferably perpendicular to one another along a majority of the rail 124. In other embodiments the rails may take on drastically different or slight variations in shape. For example, where the pocket 121 is a circle, the rails 124 may form the portion of the lower surface outside the circle. The rails 124 may also follow generally the same direction, or in other embodiments, they may face in different directions depending on the needs of the particular embodiment. The area of the rail 124 and the lower strip 117 comprise the area of the lower surface 111 along which obstacles preferably slide. For example, in a situation where a user has installed the depicted embodiment to the front bumper of a vehicle, should that person run over a curb, the curb would slide up the first edge 113 and along the lower strip 117 and onto the rails 124. In this example, the vehicle bumper receives less force on account of the substantially reduced surface area it comes in contact with on account of the pocket 121 having been moved away from the obstacle. Oddly shaped obstacles may also contact other portions of the protective panel 110, however, the amount of contact is reduced. In a preferred embodiment, shape of the pocket 121 consists of specifically profiled edges or otherwise non-perpendicular edges in order to avoid hard corners where obstacles could snag. In addition, the edges 122 of pocket 121 may be a radius extending from the floor of the pocket 121 to the rail edge 125 such that an obstacle striking the edges 122 do not encounter perpendicular points thereby reducing the risk of an obstacle snagging the protective panel 110.

Referring now to FIG. 2C, which illustrates a preferred embodiment 100 of the protective panel 110 from the opposite side illustrated in FIGS. 2A and 2B. The pocket 121 may bi-sect the rearward edge 114 thereby creating a shorter or smaller edge 115. The rearward edge 114 and 115 serve to protect the vehicle when moving in an alternative direction. Embodiments of the present invention may also include any number of mounting points 130. For example, 131 and 132 refer to factory, or added non-factory mounting points. Mountings points 130 may also include other type of reliefs in the protective panel 110 in order to allow a fastener, for example factory screws, rivets, self-tapping screws, and the like to pass through the protective panel and into the part to which the panel will attach. In some embodiments the location of factory fasteners is not constant, and a larger relief may be used to account for this variation. In other embodiments the protective panel 110 may include an embodiment where the mounting point refers to adhesively bonded mountings points using, for example, adhesive such as double sided tape, epoxy, glue, or further where the part may be sonically welded, or welded on. A mounting point 130 or 131 may be located near the first edge 113, the second edge 114, a pocket 121 or a rail 124. In some embodiments adjustments to the shape of a pocket 121, rail 124 may be necessary to accommodate for the mounting point and allow for adequate spacing and structural integrity.

Figure 3:
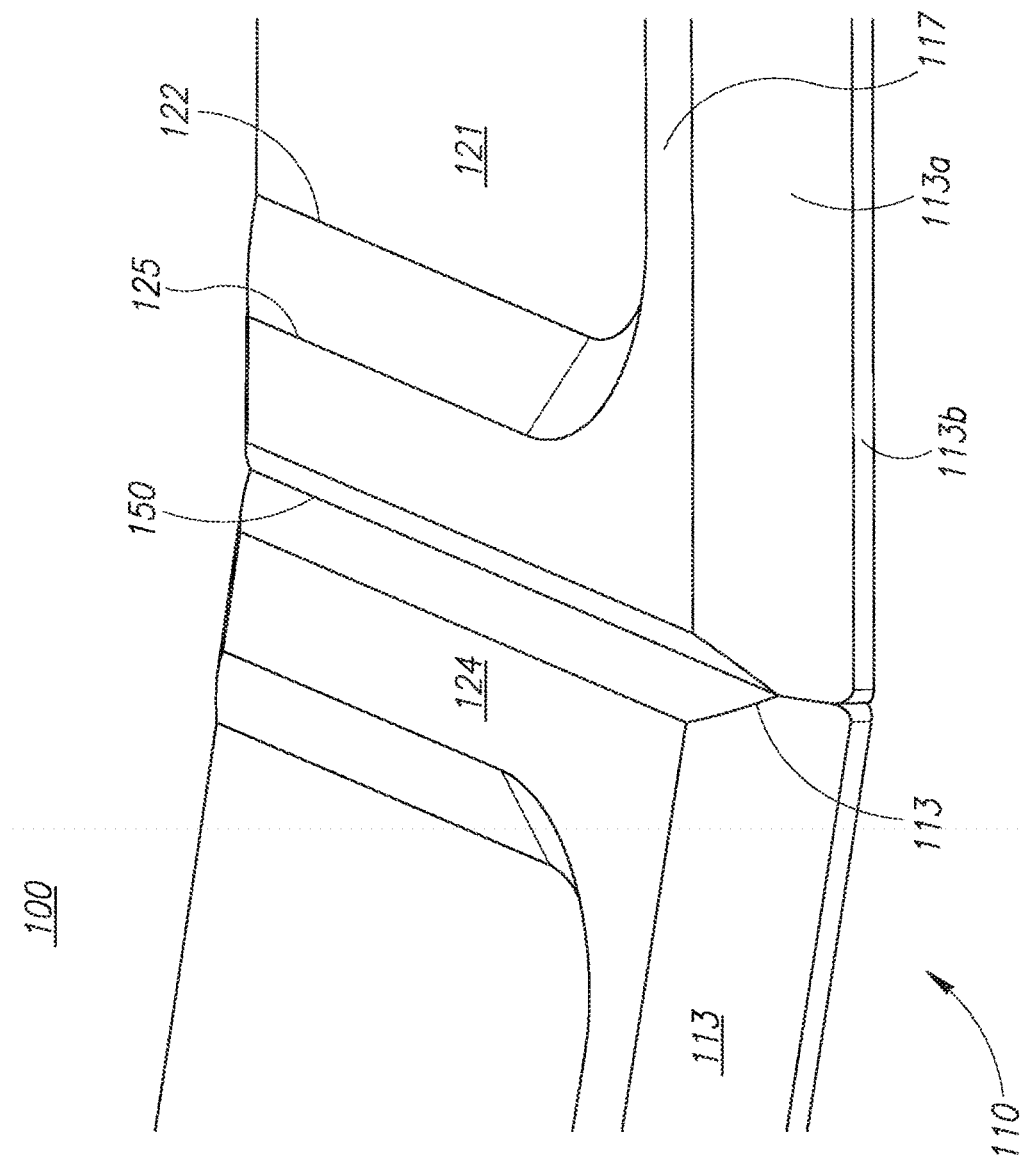
FIG. 3 is a zoomed-in-view of a protective panel according to an embodiment of the present invention.

Referring now to FIG. 3, which illustrates an embodiment 100 of a protective panel 110 having a joint portion 150. In some embodiments of the invention, providing a protective panel 110 as a single piece may be impractical. In order to decrease the amount of mounting points required, a joint portion 150 may be used to securely attach two individual protective panels 110 to form one large and uniform piece. This can be accomplished by creating a male and female portion on the upper surface 112 or by butting the portions together, or by creating male and female portions at a different point between the upper and lower surfaces. Mounting points 130 may still be optionally used at a joint portion 150. In some embodiments the sides of the joint portion 150 are comprised of a similar or identical profiles used on the first edge 113.

Figure 4:
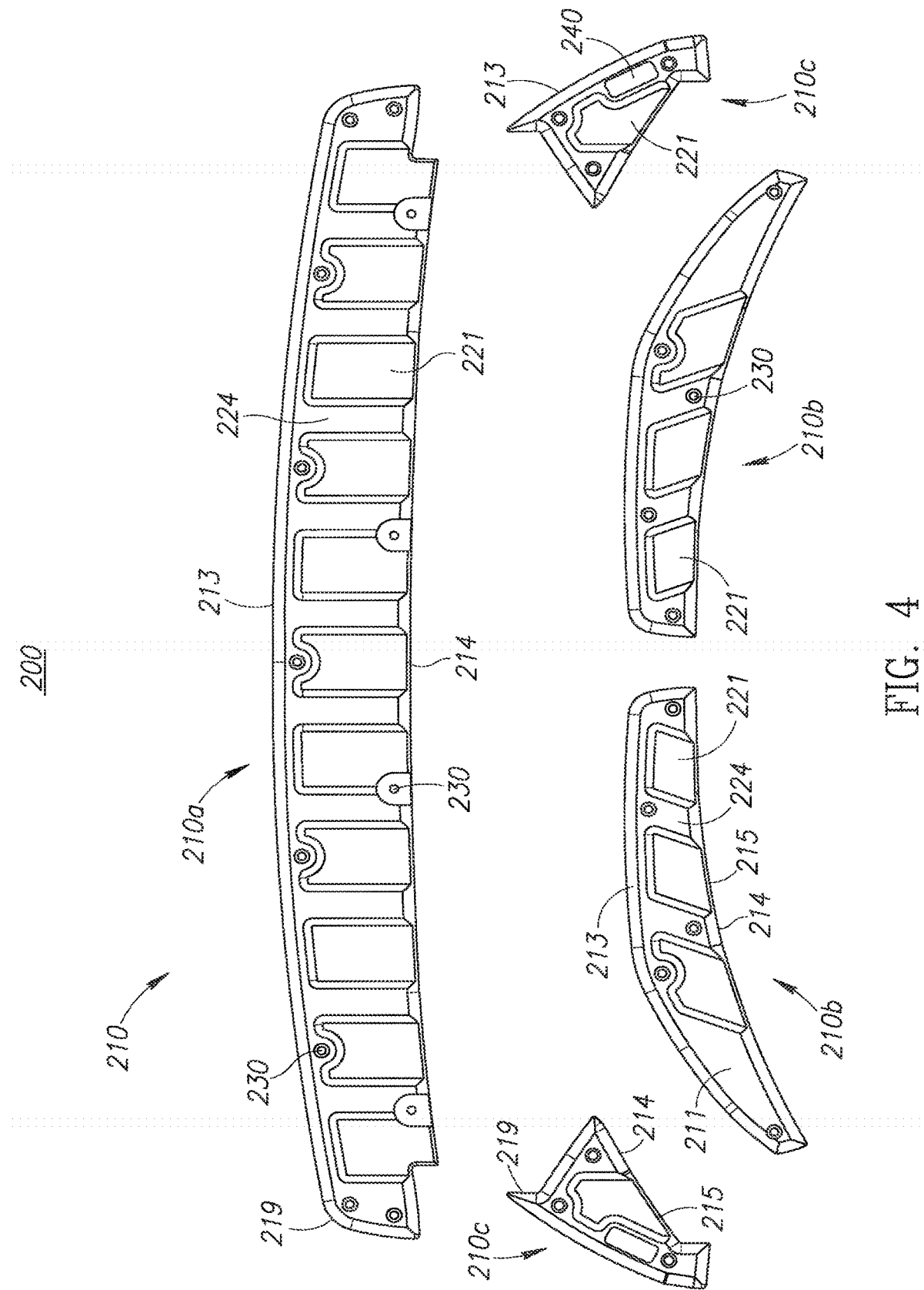
FIG. 4 is a top down view of a protective panel according to another embodiment of the invention.

Referring now to FIG. 4, which illustrates another possible embodiment 200 of a protective panel 210 where the protective panel 210 is made of any number of sub-portions 210*a-n*. In some embodiments, it may be unnecessary to install a protective panel at one or more points along a single portion of the vehicle. For example, where only a limited portion of a bumper is likely to contact obstacles. Or, in other embodiments, extreme angles may make single piece protective panels impractical to design, manufacture, or ship. Or further still, for packaging or reasons of economy, or for any other reason, a user may wish to use a protective panel 210 where the panel is made of more than one individual part 210*a-n*. A multi-piece protective panel 210 may include, for example, and is not limited to, a center portion 210*a*, two off center portions 210*b* and two corner portions 210*c*. When installed, 210*a* may be located in the middle, 210*b* on either side of 210*a*, and 210*c* at the outer edges of both pieces 210*b* in order to form a complete protective, segmented barrier along the a portion of the vehicle. Where a protective panel is comprised of multiple portions, it may be comprised in a similar or identical way to those protective panels 110 described above. Each individual portion 210*a-n* may include a first edge 213 and a second edge 214, as well as any number of pockets 221 and rails 224. The size and shape of the individual protective panel portion 210*a-n* may dictate the number and shape of any pockets 221 and rails 224. For smaller portions, more extreme shapes and edges may be necessary to appropriately match the shape 219 of the exterior of the vehicle.

Figure 5:
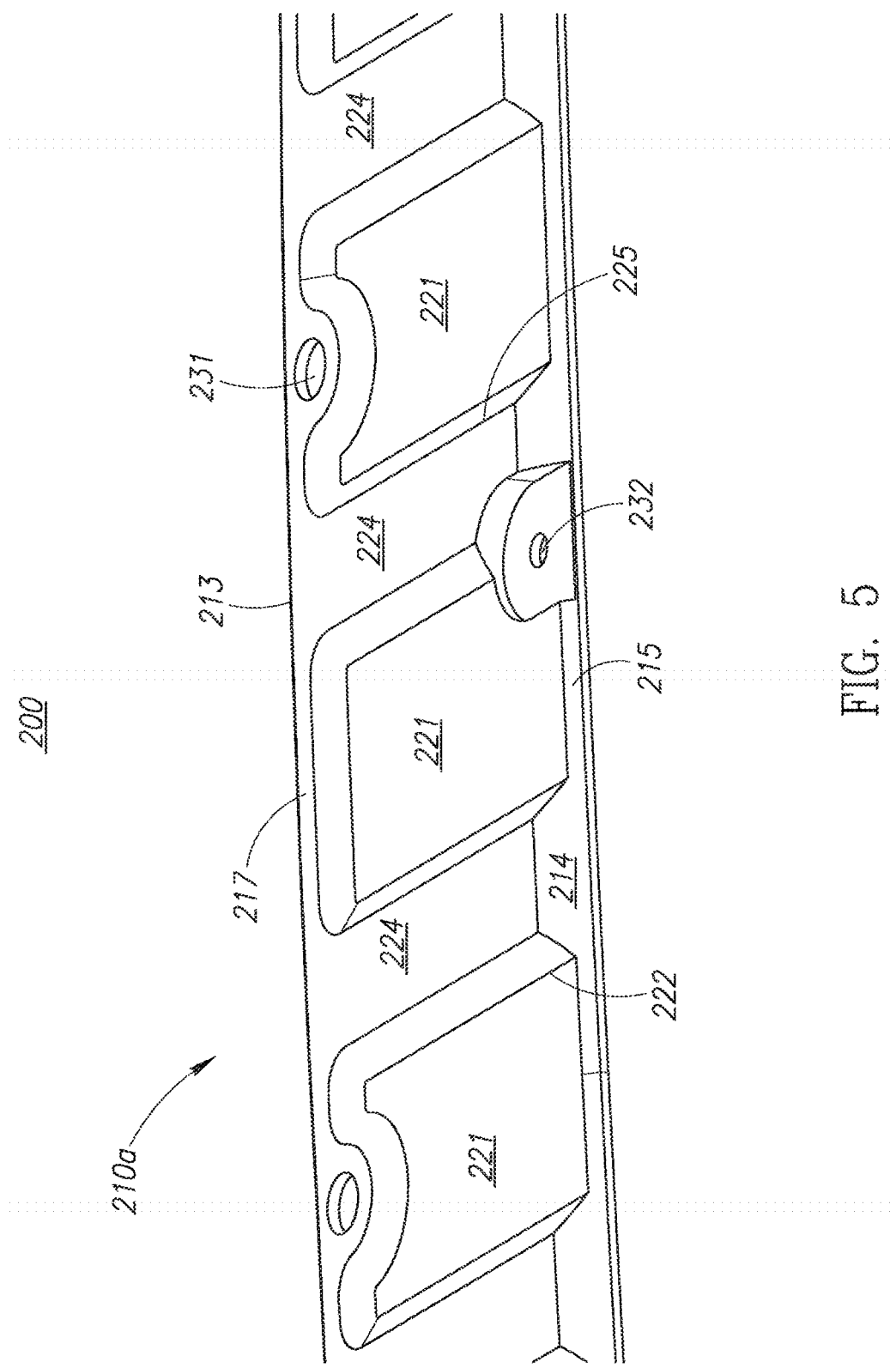
FIG. 5 illustrates various aspects of a portion of the protective panel depicted in FIG. 4.

Referring to FIG. 5, which illustrates an embodiment 200 of a protective panel 210, specifically the center portion of the protective panel 210*a* as shown in FIG. 4. The pockets 221 may be shaped to accommodate any necessary mounting points 230. For example, where a mounting point 231 is necessary near the first edge 213, the pocket 221 may be shaped to accommodate the mounting point 231 so as to provide additional, or appropriate structural integrity. In other examples the pocket shape may not be changed. Further, the rear edge 214 may be adjusted to accommodate a mounting point 232. The rearward edge of the individual protective panel 210 is designed to follow the shape 219 of whatever portion of the vehicle it has been attached to. For example, where multiple pieces 210*a-n* are used, the pieces may be drastically different shapes 219 and sizes in order to properly fit and accommodate a specific portion of the vehicle. In some embodiments where more than one protective panel 220 is used, the pockets 221 and rails 225 may be angled, generally, or exactly, in the same direction. In other embodiments the shape, angle, and size of the rails and pockets may differ.

Figure 6:
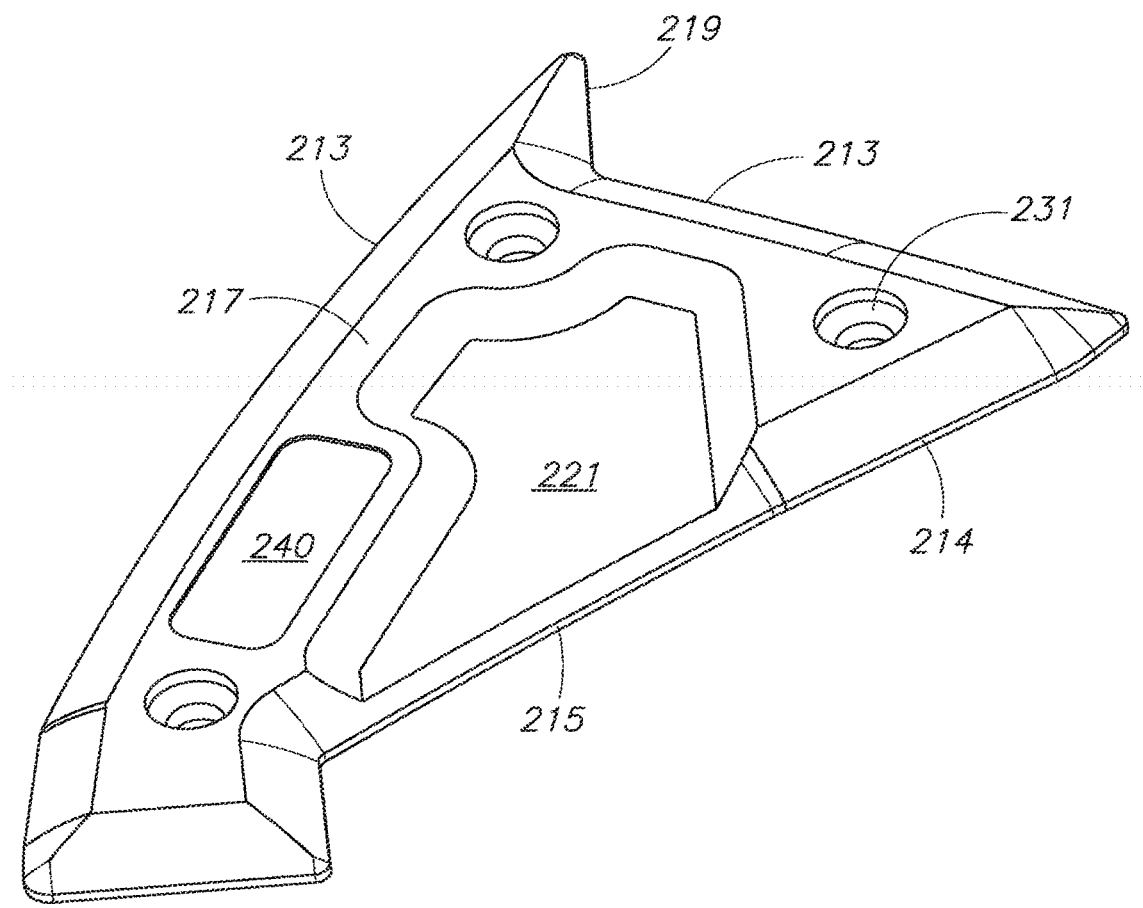
FIG. 6 illustrates various aspects of a portion of the protective panel depicted in FIG. 4; and, FIG. 7 is a three-quarter view of a protective panel according to yet another embodiment of the invention.

Referring to FIG. 6, which illustrates an embodiment 200 of a portion 210c of a protective panel 210 as shown in FIG. 4. Portions of a multi-part protective panel 210 may take any necessary shape 219. For example, as shown, an end piece 210c may have a more extreme shape 219. Any portion of a protective panel 210 may have these more extreme shapes depending on the needs of the particular part. The end portion 210c may also include a label pocket 240 in order to properly identify the product. The first edge 213 or second edge 214 may be extended or be larger, at any particular points. As shown, where two edges meet at narrower angles, the edge may be extended to provide appropriate protection, and or to correctly or more accurately follow the shape 219 of the panel to be protected. Smaller portions of a protective panel 210 may include mounting locations 230, for example non-factory holes 231 for use with, for example, and not limited by, rivets, tech screws, snaps, clips, or other mounting means. Where a protective panel is an irregular shape 219 the pocket 221 may also be shaped accordingly, the purpose of the pocket being to reduce the surface area of any portion of the protective panel 210. Any piece of a multi-piece 210 may use features of different embodiments within the same over all panel 210. For example, a center portion 210a may include larger pockets 221, and smaller rails 225, and a side section 210b may use a wider lower strip 227 and wider rails 225. Any combination is possible.

Figure 7:
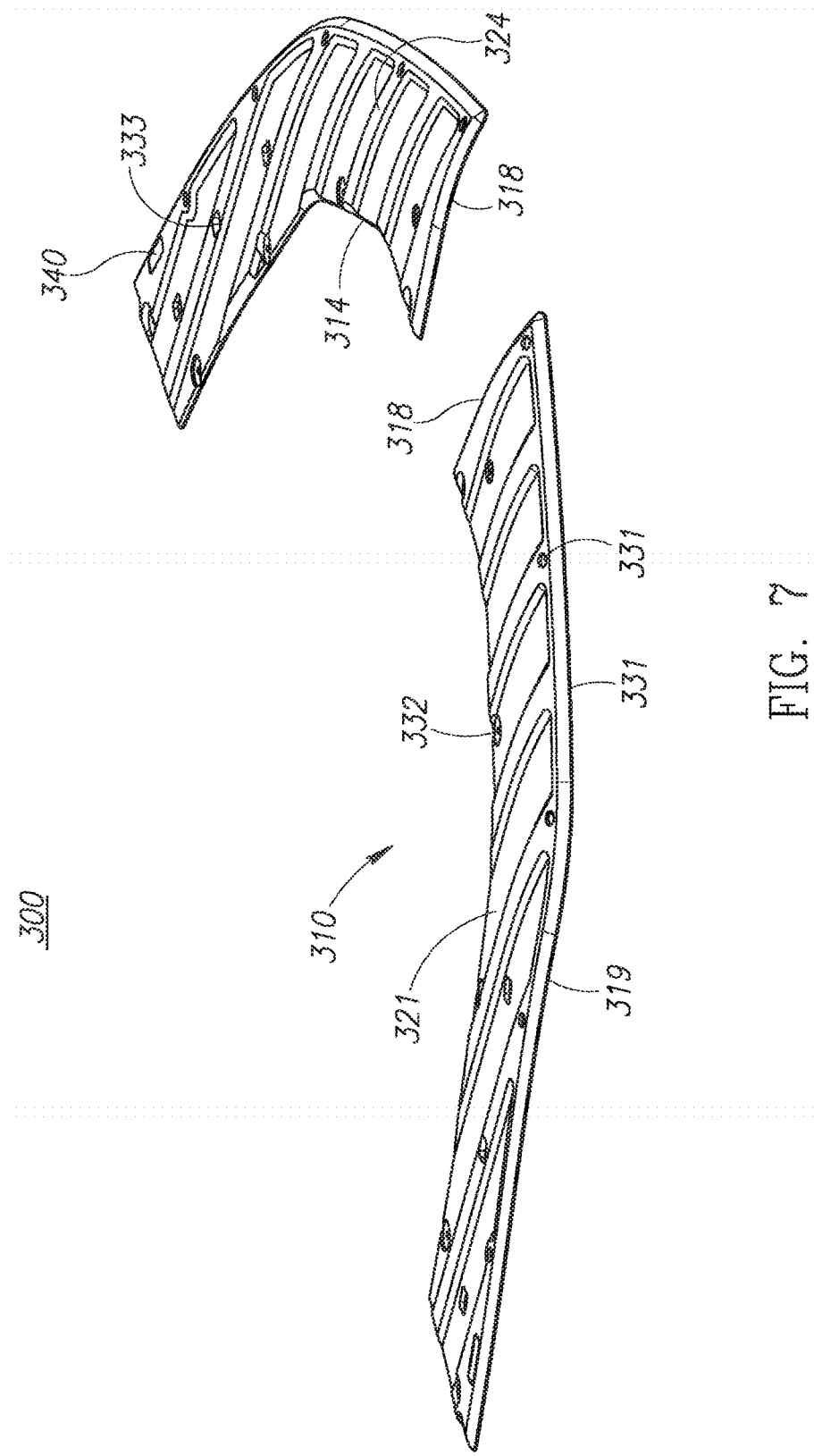

Referring to FIG. 7, which illustrates an embodiment 300 of a protective place 310. In addition to following the shape 319 of the underside of a vehicle, the protective panel 310 may also follow the contour 318. For example, the panel may be composed in such a way that it is not flat, ignoring the thickness of the panel, on the Z-axis and may be formed to follow subtle or more extreme contours in a portion of the exterior of the vehicle. In embodiments using this three-dimensional protective panel 310 it may be possible to avoid using multiple individual protective panels, and instead forming one protective panel to match the contour 318 of the portion of the vehicle to be protected. In the depicted embodiment the protective panel 310 is subtly curved along the Z-axis in addition to being of a particular shape 319 in the X-Y plain. Where a protective panel 310 is three dimensional, it may be necessary to account for any deflection or deformation in the rails 324 and pockets 321 caused by creating a truly three dimensional part. Where a protective panel 310 is three dimensional, it may include any of the concepts described above in embodiments 100 or 200. In addition, the panel may be two or more pieces. A generic mounting location 333 is also shown which allows for some variation in the location of fasteners, and may be for example an enlarged circle or square.

In the foregoing specification, the invention has been described with reference to specific exemplary embodiments. Various modifications and changes may be made, however, without departing from the scope of the present invention as set forth in the claims. The specification and figures are illustrative, not restrictive, and modifications are intended to be included within the scope of the present invention. Accordingly, the scope of the invention should be determined by the claims and their legal equivalents rather than by merely the examples described.

Benefits, other advantages, and solutions to problems have been described above with regard to particular embodiments. Any benefit, advantage, solution to problem, or any element that may cause any particular benefit, advantage, or solution to occur or to become more pronounced are not to be construed as critical, required, or essential features or components of any or all the claims.

The terms "comprise", "comprises", "comprising", "having", "including", "includes" or any variations of such terms, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

While the preferred embodiment of the invention has been illustrated and described, as noted above, many changes can be made without departing from the spirit and scope of the invention. For example, a protective panel may be used in other fields, or may not form a shape generally representative of a portion of a vehicle panel. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An accessory protective panel for a vehicle, comprising:
   an upper surface;
   a lower surface opposite the upper surface;
   a non-square edge portion disposed at every point along a perimeter, between the upper and lower surface, the perimeter configured to substantially conform to a specific portion of the vehicle, and wherein the edge portion comprises a first, front edge and a second rear edge, opposite the first edge;
   a reduced lower surface area, wherein a total surface area of a portion of the lower surface configured to contact an obstacle, is a surface area less than a potential total area encompassed by the edge portion disposed along the perimeter; and
   at least one mounting point for removably attaching the panel to the vehicle.

2. The protective panel of claim 1 wherein the protective panel is configured to substantially conform to a shape and a contour of specific a portion of the vehicle.

3. The protective panel of claim 1 wherein the first edge comprises two or more profiles.

4. The protective panel of claim 1 wherein the portion of lower surface configured to contact an obstacle extends from a remainder of the lower surface opposite the upper surface.

5. The protective panel of claim 4 wherein the at least one mounting point for removably attaching the panel to the vehicle comprises double sided tape disposed at the upper surface.

6. The protective panel of claim 1 wherein the protective panel comprises two or more individual pieces.

7. The protective panel according to claim 1 wherein the first front edge and the second rear edge opposite the first edge, include one or more smaller edge sections, collectively forming the first and second edge disposed along the perimeter.

8. The protective panel according to claim 1 wherein the lower surface includes at least one pocket.

9. The protective panel according to claim 1 wherein the lower surface includes at least one pocket, and further wherein the at least one pocket extends through the edge portion along the perimeter.

10. The protective panel according to claim 1 wherein each of the at least one mounting point allows the upper surface to be attached to a portion of the vehicle using a factory fastener location.

11. A protective panel for a vehicle, comprising:
an upper surface for engaging the vehicle;
a lower surface opposite the upper surface;
a first edge extending from the upper surface to the lower surface and disposed such that the first edge follows generally a shape of a first portion of the vehicle and where the first edge has at least one non-square edge profile;
a second edge extending from the upper surface to the lower surface and disposed such that the second edge follows generally a shape of a second portion of the vehicle and where the second edge has at least one non-square edge profile, and further such that the second edge meets the first edge in order to form a perimeter portion;
at least one pocket in the lower surface, wherein a resulting surface area of the lower surface is less than a potential surface area encompassed by the perimeter; and,
at least one mounting point for removably attaching the panel.

12. The panel of claim 11 wherein the upper surface and lower surface substantially conform to a shape and a contour of a specific portion of the vehicle.

13. The protective panel of claim 11 wherein the first edge comprises one or more portions collectively forming an edge profile.

14. The protective panel of claim 11 wherein the at least one pocket is at least 0.1 inches from the first edge and further wherein the at least one pocket extends through one or more portions of the second edge.

15. The protective panel of claim 11 wherein the lower surface is a surface area at least 20% less than the potential area encompassed by the perimeter edge.

16. The protective panel of claim 11 wherein the first edge and second edge are configured to extend to a boundary of a specific portion of the vehicle such that there is a substantially continuous transition between the specific portion of the vehicle and the perimeter portion of the protective panel.

17. The protective panel of claim 11 further comprising a locking portion wherein the locking portion selectively connects two or more individual protective panels.

18. The protective panel of claim 13 wherein the edge profile is comprised of at least a first portion and a second portion, wherein the first portion comprises a rounded profile, and the second portion comprises a angled profile.

* * * * *